United States Patent
Chunodkar et al.

(10) Patent No.: US 11,046,309 B2
(45) Date of Patent: Jun. 29, 2021

(54) DYNAMIC TORQUE MANAGEMENT TECHNIQUES FOR ENHANCED ENGINE CYCLE EFFICIENCY

(71) Applicant: Cummins Inc.

(72) Inventors: Apurva Arvind Chunodkar, Greenwood, IN (US); Kenneth M. Follen, Greenwood, IN (US); Mugdha S. Sane, Columbus, IN (US); Srinivas Chakravarthy Bathula, Columbus, IN (US); Arun Prakash Thunga Gopal, Columubs, IN (US); Vivek A. Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 149 days.

(21) Appl. No.: 16/344,056

(22) PCT Filed: Oct. 24, 2017

(86) PCT No.: PCT/US2017/058000
§ 371 (c)(1),
(2) Date: Apr. 23, 2019

(87) PCT Pub. No.: WO2018/081062
PCT Pub. Date: May 3, 2018

(65) Prior Publication Data
US 2019/0263400 A1   Aug. 29, 2019

Related U.S. Application Data

(60) Provisional application No. 62/411,975, filed on Oct. 24, 2016.

(51) Int. Cl.
*B60W 30/14* (2006.01)
*B60W 10/06* (2006.01)
(Continued)

(52) U.S. Cl.
CPC .......... *B60W 30/143* (2013.01); *B60W 10/04* (2013.01); *B60W 10/06* (2013.01);
(Continued)

(58) Field of Classification Search
CPC ......... B60W 30/143; B60W 30/18136; B60W 10/04; B60W 10/06; B60W 10/10;
(Continued)

(56) References Cited

U.S. PATENT DOCUMENTS

| 6,367,462 B1 | 4/2002 | McKay et al. |
| 8,352,155 B2 | 1/2013 | Schindler et al. |

(Continued)

FOREIGN PATENT DOCUMENTS

| DE | 102016106273 | 10/2016 |
| EP | 2796696 | 10/2014 |
| GB | 1281040 | 7/1972 |

OTHER PUBLICATIONS

Extended EP Search Report, EP Appln. No. 17864460.5, dated May 26, 2020, 8 pgs. Mar. 26, 2020.
(Continued)

*Primary Examiner* — Anne Marie Antonucci
*Assistant Examiner* — Sahar Motazedi
(74) *Attorney, Agent, or Firm* — Taft Stettinius & Hollister LLP

(57) ABSTRACT

One embodiment is a method of operating an electronic control system (ECS) to control an engine to propel a vehicle. The method comprises receiving a throttle command, determining an operation to increase engine cycle efficiency by reducing engine torque below a magnitude corresponding to the throttle command and below a torque curve limit over a first vehicle operation segment and permitting an increase in engine torque above the torque curve limit over a second vehicle operation segment, con-
(Continued)

trolling the engine to output torque below the magnitude corresponding to the throttle command and below the torque curve limit over the first vehicle operation segment, and controlling the engine to output torque above the torque curve limit over the second vehicle operation segment in response to a second received throttle command and constrained by an extended limit on operation of the engine above the torque curve limit.

30 Claims, 8 Drawing Sheets

(51) Int. Cl.
    *B60W 30/18*     (2012.01)
    *F02B 37/12*     (2006.01)
    *F02D 41/00*     (2006.01)
    *F02D 41/14*     (2006.01)
    *F02D 41/02*     (2006.01)
    *F02D 29/02*     (2006.01)
    *F02D 11/10*     (2006.01)
    *B60W 10/04*     (2006.01)
    *B60W 10/10*     (2012.01)
    *F16H 63/50*     (2006.01)

(52) U.S. Cl.
    CPC ...... *B60W 10/10* (2013.01); *B60W 30/18136* (2013.01); *F02B 37/12* (2013.01); *F02D 11/105* (2013.01); *F02D 29/02* (2013.01); *F02D 41/0007* (2013.01); *F02D 41/021* (2013.01); *F02D 41/1402* (2013.01); *B60W 2510/0657* (2013.01); *B60W 2520/10* (2013.01); *B60W 2530/10* (2013.01); *B60W 2540/10* (2013.01); *B60W 2552/15* (2020.02); *B60W 2710/0622* (2013.01); *B60W 2710/0627* (2013.01); *B60W 2710/0638* (2013.01); *B60W 2710/0666* (2013.01); *B60W 2720/10* (2013.01); *F02D 2041/1412* (2013.01); *F02D 2041/1432* (2013.01); *F02D 2200/1002* (2013.01); *F02D 2200/501* (2013.01); *F02D 2200/702* (2013.01); *F02D 2250/26* (2013.01); *F16H 63/50* (2013.01); *Y02T 10/12* (2013.01)

(58) Field of Classification Search
CPC ..... B60W 2510/0657; B60W 2552/15; B60W 2520/10; B60W 2530/10; B60W 2540/10; B60W 2710/0622; B60W 2710/0627; B60W 2710/0638; B60W 2710/0666; B60W 2720/10; F02B 37/12; F02D 11/105; F02D 29/02; F02D 41/0007; F02D 41/021; F02D 41/1402; F02D 2041/1412; F02D 2041/1432; F02D 2200/1002; F02D 2200/501; F02D 2200/705; F02D 2250/26; F16H 63/50; Y02T 10/12
See application file for complete search history.

(56) References Cited

U.S. PATENT DOCUMENTS

| 9,020,726 | B2 | 4/2015 | Boeckenhoff et al. |
| 2007/0272216 | A1* | 11/2007 | Hollenbeck ......... F02D 41/2422 123/480 |
| 2011/0106388 | A1* | 5/2011 | Boeckenhoff ......... B60W 10/06 701/70 |
| 2013/0144514 | A1 | 6/2013 | Choi et al. |
| 2013/0177167 | A1* | 7/2013 | Takahashi ............. B60Q 5/008 381/86 |
| 2013/0325291 | A1 | 12/2013 | Kar et al. |
| 2014/0336890 | A1* | 11/2014 | Kresse ................... F16H 59/54 701/60 |
| 2014/0352669 | A1 | 12/2014 | Cunningham et al. |
| 2015/0345621 | A1 | 12/2015 | Sujan et al. |
| 2015/0361915 | A1* | 12/2015 | Proctor ................. B60W 10/10 701/54 |
| 2016/0039418 | A1 | 2/2016 | Wall et al. |
| 2016/0297435 | A1 | 10/2016 | D'Amato |
| 2017/0298811 | A1* | 10/2017 | Santillo ............... F02D 41/0007 |
| 2018/0338059 | A1* | 11/2018 | Ohigashi ................ F02D 11/10 |

OTHER PUBLICATIONS

Search Report and Written Opinion, PCT Appln. No. PCT/US17/58000, dated Dec. 12, 2017, 11pgs.

\* cited by examiner

DYNAMIC TORQUE MANAGEMENT TECHNIQUES FOR ENHANCED ENGINE CYCLE EFFICIENCY

CROSS REFERENCE

The present application is a U.S. national stage application under 35 U.S.C. 371 of International Application No. PCT/US17/5800 filed Oct. 24, 2017 and claims priority to and the benefit of U.S. Application No. 62/411,975 filed Oct. 24, 2016 the disclosure of which is hereby incorporate by reference.

BACKGROUND

The present application relates to dynamic torque management techniques for enhanced engine cycle efficiency and to apparatuses, methods and systems providing or pertaining to the same. Such techniques may be implemented in control apparatuses, methods systems for a variety of engines and a variety of vehicles including mine haul trucks to name one example. Vehicle operators may seek to improve engine cycle efficiency. Existing proposals for engine cycle efficiency suffer from a number of shortcomings and drawbacks. There remains a significant need for the unique apparatuses, methods and systems disclosed herein.

DISCLOSURE OF ILLUSTRATIVE EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique apparatuses, methods and systems of dynamic torque management are disclosed. One embodiment is a method of operating an integrated circuit-based electronic control system (ECS) to control an engine to propel a vehicle. The method comprises receiving a throttle command with the ECS, determining with the ECS an operation to increase engine cycle efficiency by reducing engine torque below a magnitude corresponding to the throttle command and below a torque curve limit over a first vehicle operation segment and permitting an increase in engine torque above the torque curve limit over a second vehicle operation segment, controlling the engine to output torque below the magnitude corresponding to the throttle command and below the torque curve limit over the first vehicle operation segment, and controlling the engine to output torque above the torque curve limit over the second vehicle operation segment in response to a second throttle command received by the ECS and constrained by an extended limit on operation of the engine above the torque curve limit. Further embodiments, forms, objects, features, advantages, aspects, and benefits shall become apparent from the following description and drawings.

DETAILED DESCRIPTION OF ILLUSTRATIVE EMBODIMENTS

Figure 1:
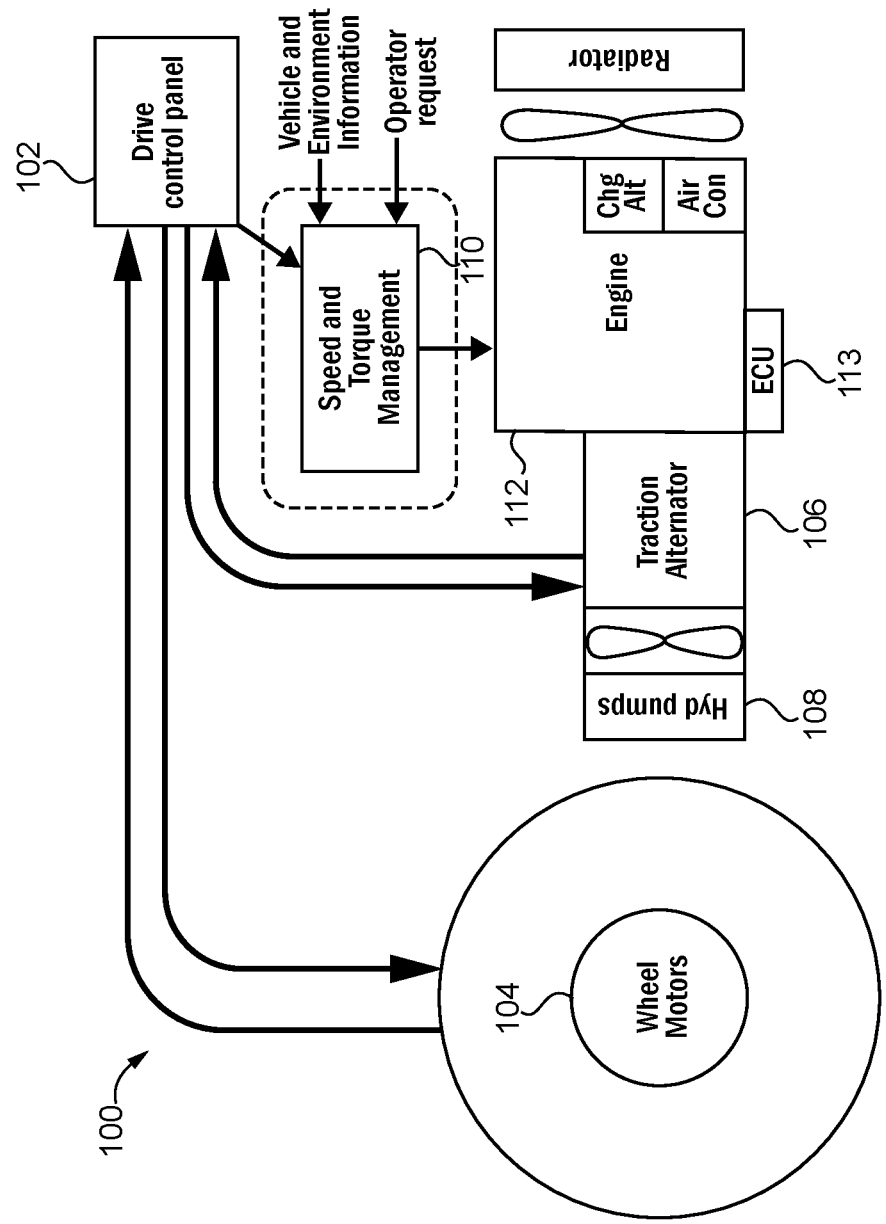
FIG. 1 is a schematic illustration of an exemplary vehicle system.

With reference to FIG. 1, there is illustrated a schematic depiction of an exemplary vehicle system 100. In the illustrated form, the vehicle system 100 is configured as a diesel-electric driveline vehicle, such as a mine haul vehicle, although a variety of other vehicle forms are contemplated, including but not limited to diesel engine drive trucks, other on-highway vehicles, other off-highway vehicles, and other related vehicles. In the illustrated embodiment, the vehicle system 100 includes a driveline control panel 102 communicatively coupled to the wheel motors 104 (i.e., drive wheels) of vehicle system 100. In a particular implementation, the mine haul vehicle system 100 is coupled to the drive wheels 104 with a set of the following: a clutch (e.g., a pressure plate, centrifugal, etc.), geared transmission, a gearbox, geared or un-geared axle/hubs. In implementations, the driveline control panel 102 can be configured to issue one or more commands associated with the operation of the wheel motors 104.

In the illustrated embodiment, the driveline control panel 102 is communicatively coupled to a traction alternator system 106 and a hydraulic pump system 108. The driveline control panel 102 is also communicatively coupled to a dynamic torque management system (DTMS) controller 110 which is one example of a speed torque management system (STMS). The DTMS controller 110 may be operatively coupled with or may be implemented in as a component of an engine controller 113 structured to control operation of engine system 112. In embodiments, the DTMS controller 110 manages available power based on an estimated power demand to reduce an excess fuel burn (i.e., fuel consumption). In embodiments, the DTMS controller 110 is configured to determine instantaneous torque requirements based on look-ahead (i.e., forecast) engine torque requirements. The speed torque management system can be configured to receive vehicle environment information and operator requests as input parameters and in response issue one or more commands to the engine system 112. The engine system can include an engine controller 113, an alternator system, air conditioner system and a radiator system. In embodiments, the DTMS controller 110 provides engine speed and torque references and limits to improve productivity and optimization of vehicle performance metrics (e.g., mine haul vehicle/truck performance metrics). In particular embodiments, the DTMS controller 110 provides engine speed and torque references and limits to improve productivity at a mine level.

During operation of vehicle system 100, an operator may desire to optimize vehicle performance metrics, while also addressing emission requirements. Advantageously, in particular embodiments, optimization can be achieved by managing and limiting engine power (torque and speed) transients. Managing engine power transients can include: one or more of prescribing a static torque limit, prescribing a static torque limit based on a vehicle mass and a current road grade and prescribing a dynamic torque limit through the vehicle mass, the look-ahead (i.e., forecast) road grade, and the vehicle stop location. Managing static or dynamic engine speed limits can include: one or more of prescribing a static engine speed limit, prescribing a static engine speed limit based on vehicle mass and current road grade and prescribing dynamic engine speed limit through vehicle mass and look-ahead road grade, and vehicle stop location. Also, speed and torque limits can be managed based on varying the vehicle mass, and can include the enabling and disabling of speed and torque limits.

In certain embodiments of the DTMS controller 110, active management of the torque curve can be implemented such as to "release" the torque curve (e.g., permit excursions above the torque limits normally imposed by the torque curve). For example, the bulk of fuel burn over a duty cycle is expected at or proximately near peak power. Fuel consumption benefits of the DTMS controller 110 alone can in some instances be limited to mid-to-low loads or can occur at higher loads with an increase in cycle time. In certain embodiments, engine (base) torque curve (i.e., a base torque curve) may be adjusted (e.g., increased) for brief time periods to another curve (e.g., an extended torque curve). Small "excursions" of the engine torque curve (during peak loading conditions may yield fuel consumption benefits while maintaining an engine durability. In other embodiments, one or more constraints can also be used including: a total time over base torque curve limited depending on (1) an engine work done over a torque curve less than a particular metric (i.e., a particular value); (2) the total time spent over a torque curve over a specified time less than a particular metric; and/or (3) the time spent over a torque curve per excursion less than a particular metric.

In implementations, the torque curve release can be formed by temporarily switching between a base metric (e.g., a particular metric that the engine controller 113 utilizes when operating the engine 112) and an upper torque curve based on a particular criteria coming from look-ahead engine power requirements and constraints on time above a torque curve or work done above the torque curve. The torque curve release may also include multiple torque curves whose selection may be trimmed by an operator/owner or dynamically set by the engine controller 113 based on an associated importance or priority given to the particular benefits. In examples implementations, a torque curve release status may be communicated to an operator or owner through an interface such as a via a telematics system.

Driveline control panel 102, DTMS controller 110 and engine controller 113 are exemplary components of an integrated circuit-based electronic control system (ECS) which may be configured to control various operational aspects of vehicle system 100 and engine system 112 as described in further detail herein. An ECS according to the present disclosure may be implemented in a number of forms and may include a number of different elements and configurations of elements. In certain preferred forms an ECS may incorporate one or more microprocessor-based or microcontroller-based electronic control units (ECU) sometimes referred to as electronic control modules (ECM). An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

Figure 2:
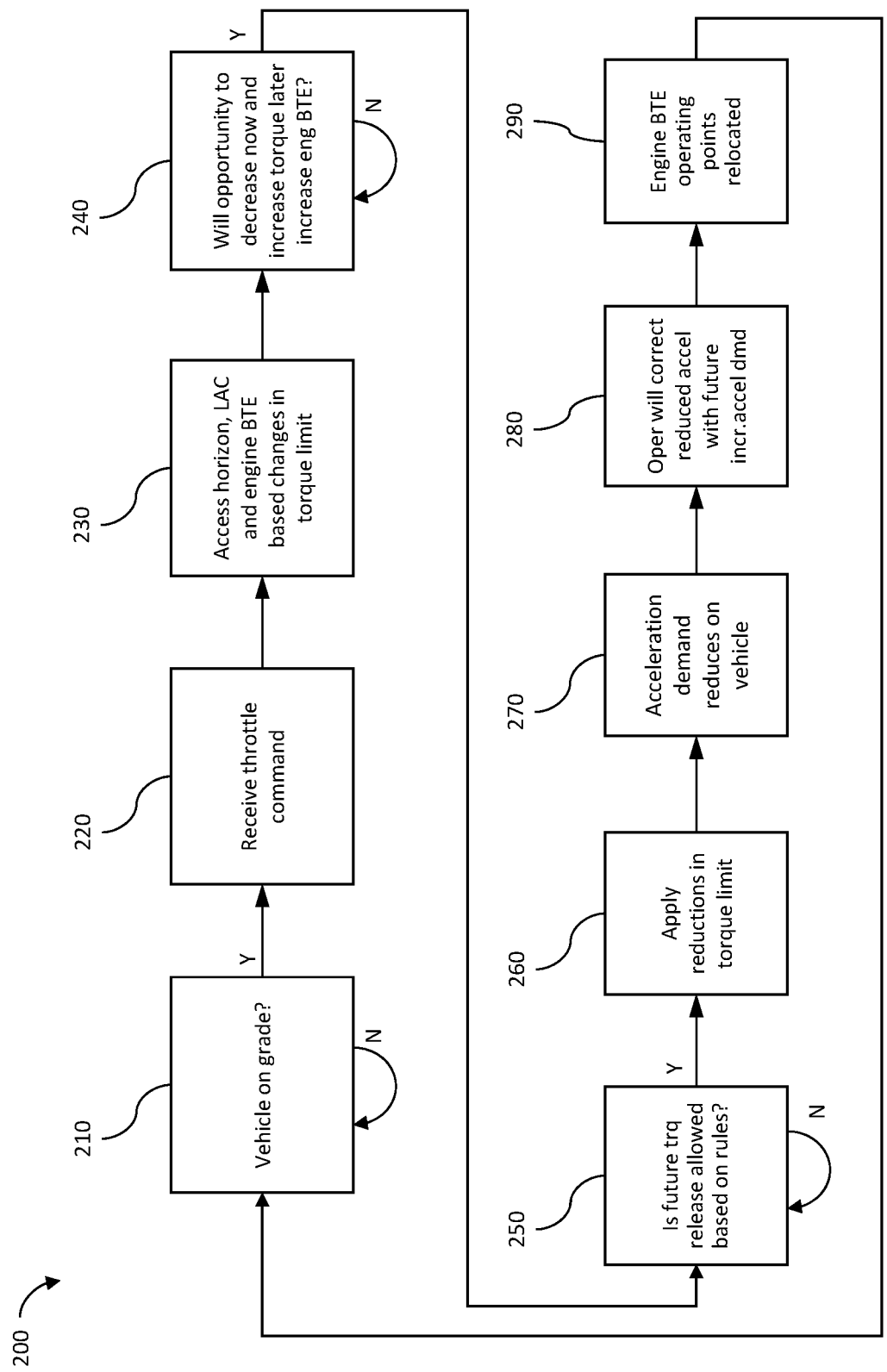
FIG. 2 is a flow chart illustrating certain aspects of an exemplary control process.

With reference to FIG. 2 there is illustrated a flow diagram illustrating certain aspects of an exemplary control process 200 which may be performed by an ECS control component such as DTMS controller 110, engine controller 113 or combinations of these and/or other ECS control components. The exemplary control process 200 illustrates the operational a behavior of a torque curve excursion or release feature. In operation 210, control process 200 evaluates whether a vehicle system with which it is associated, such as vehicle system 100, is positioned on grade. The evaluation of whether a vehicle system is on a grade may be performed using a number of predetermined criteria. In certain forms, the control process 200 may receive information from an inclinometer and evaluate the received information using one or more criteria. Examples of the criteria which may be utilized include evaluating whether the received input indicates a non-zero grade and whether the received input exceeds a grade threshold. If operation 210 determines that the vehicle is not on a grade, operation 210 may repeat until such a determination is made. If operation 210 determines that the vehicle is on grade, control process 200 proceeds to operation 220.

At operation 220 control process 200 receives a throttle command which in response to an operator input, for example, a command resulting from an accelerator position or a cruise control setting. From operation 220, control process 200 proceeds to operation 230. Operation 230 evaluates one or more parameters of a look-ahead horizon for vehicle operating conditions which may include look-ahead information indicative of future road grade, future throttle command and/or a future vehicle speed. Operation 230 also performs one or more evaluations of engine cycle efficiency (e.g., engine brake thermal efficiency (BTE), engine specific fuel consumption (SFC) or other measures of engine efficiency over an engine operation cycle which may be divided into engine operating segments) using look-ahead information, for example, evaluating the BTE consequences over a load acceptance curve (LAC) relative to an engine brake thermal efficiency map information such as illustrated and described in connection with FIG. 3.

From operation 230, control process 200 proceeds to operation 240. Operation 240 determines whether there is an operation to increase engine cycle efficiency by reducing engine torque below a magnitude corresponding to the throttle command and below a torque curve limit over a first vehicle operation segment and permitting an increase in engine torque above a torque curve limit over a second vehicle operation segment, for example, as illustrated and described in connection with FIG. 3. The first vehicle operation segment and the second vehicle operation segment may extend over respective portions of a look-ahead horizon of vehicle operating conditions and may be defined in terms or units of time or distance. It shall be appreciated that a number of techniques for evaluating whether an opportunity is available to decrease the applied torque limit in a first time interval but increase the applied torque limit in a subsequent second time interval to result in an increase in engine cycle efficiency may be utilized. The determination performed by operation 240 may consider look-ahead information including at least one of a future road grade, a future throttle command and a future vehicle speed. The determination performed by operation 240 may also consider the effects of a load acceptance curve (LAC) relative to SFC information such as an SFC contour map.

From operation 240, control process 200 proceeds to operation 250. At operation 250 control process 200 evaluates whether a future torque release event is permissible based on one or more torque release criteria. Exemplary torque release criteria may comprise one or more limits on engine operation above the torque curve limit, for example, the availability of an operating point that exceeds a torque curve limit but falls within an extended torque limit such as a torque release curve or other torque release parameters. In certain forms the operation 250 may be performed in parallel with or as a part of operation 250. If the evaluations of operations 240 and 250 do not identify an operation to increase engine cycle efficiency by reducing engine torque below a magnitude corresponding to the throttle command and below a torque curve limit over a first vehicle operation segment and permitting an increase in engine torque above a torque curve limit over a second vehicle operation segment, these operations may repeat of control process 200 may proceed to an earlier operation, for example, operation 210. If the evaluations of operations 240 and 250 do identify an operation to increase engine cycle efficiency by reducing engine torque below a magnitude corresponding to the throttle command and below a torque curve limit over a first vehicle operation segment and permitting an increase in engine torque above a torque curve limit over a second vehicle operation segment control process 200 proceeds to operation 260.

At operation 260, control process 200 controls an engine to output torque below the magnitude corresponding to the received throttle command over the first vehicle operation segment. Such reduction may be accomplished by applying a torque reduction limit. From operation 260 control process 260 proceeds to operation 270 where the acceleration demand of the vehicle is reduced as a consequence of the applied torque reduction limit. From operation 270 control process proceeds to operation 280 in which control process 200 permits the engine to output torque above the torque curve limit over the second vehicle operation segment in response to an increased throttle command received by the ECS and constrained by the one or more limits on engine operation above the torque curve limit. This operation allows an operator or a cruise control feature to correct the reduced acceleration with a subsequent increase in throttle command or acceleration demand (e.g., increased accelerator position or increase cruise control speed reference) by extending the torque limit imposed on the engine. At the same time the torque limit is preferably extended only to allow operation at a point which results in, or is predicted to result in, increased engine BTE. From operation 280 control process 200 proceeds to operation 290. At operation 290, as a result of the foregoing operations, the engine operating points have been relocated to relocated to provide increased engine BTE and the control process 200 may end or may return to operation 210.

Figure 3:
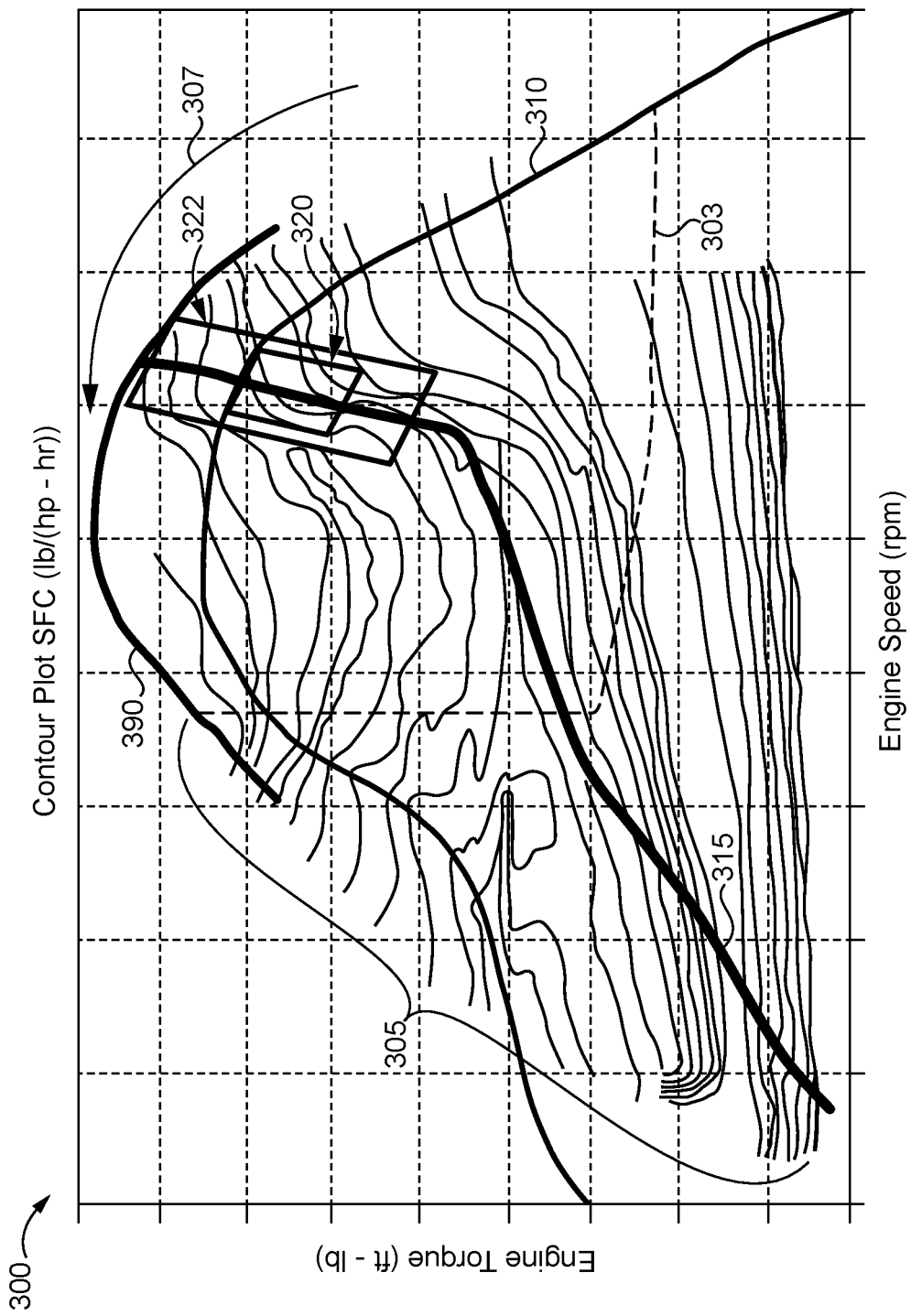
FIG. 3 is an exemplary engine operating map.

With reference to FIG. 3, there is illustrated an exemplary engine operating map 300. Operating map 300 may be provided as a multi-dimensional table or other data structure stored in one or more non-transitory computer readable memory media associated with and accessible by one or more ECS control components of vehicle system 100. The vertical axis of operating map 300 indicates engine torque in units of foot-pounds. The horizontal axis of operating map 300 indicates engine speed in revolutions per minute (rpm). Boundary line 303 indicates a not to exceed (NTE) operation region of operating map 300. The contour plot lines 305 of operating map 300 illustrate specific fuel consumption (SFC) in pounds per horsepower-hour (lb/(hp-hr)). Arrow 307 indicates the general direction in which SFC decreases and in which engine BTE increases between contour plot lines 305. Torque curve 310 defines an operating boundary which is normally imposed on engine operation. A torque release curve 390 defines an extended operating boundary within which the engine may operate when extended torque limit operation is permitted.

Load acceptance curve (LAC) 315 may be utilized by an ECS control component such as DTMS controller 110 as a defined path along which different engine operation points may be set. In certain embodiments or certain operating modes engine operating points may be required to be on or to intersect LAC 315. In certain embodiments or certain operating modes engine operating points may be required to be within a range of LAC 315 (e.g. +/−x %, where "x" is a numeric percentage limit on variation from LAC, or +/1 n, where n is a numeric value limit on variation from LAC). In certain embodiments or certain operating modes engine LAC 315 may be absent or may not be used and engine operating points may be set without limitation relative to LAC 315.

Region 320 indicates a region along and near LAC 315 in which engine torque is at or near its maximum permitted value when constrained by torque curve 310. When a throttle command is received during operating conditions that would result in operating points in region 320, the minimum SFC value (and the maximum BTE) that is possible at these operating points is also bounded by torque curve 310. Extended region 322 includes an upper portion extending above region 320 in which engine torque is permitted to exceed torque curve 310 and is instead bounded by torque release curve 390. Extended region 322 also includes a lower portion extending below region 320.

Region 320 and extended region 322 illustrate an exemplary operation that can be performed to increase engine cycle efficiency by reducing engine torque below a magnitude corresponding to the throttle command and below a torque curve limit over a first vehicle operation segment and permitting an increase in engine torque above a torque curve limit over a second vehicle operation segment. By using a look-ahead prediction accounting for future engine operating points over a horizon of engine operation, it can be seen that there certain operating scenarios in which regions 320 and 322 provides disparate SFC and BTE results. For example, if operation is not constrained to region 320 during an operating horizon, but can instead extend into the upper and lower portions of extended region 322, a first operating segment can be torque constrained to force operation in the lower portion of extended region 322 which has lower SFC providing greater BTE than region 320. As described in connection with control process 200, this torque constraint may result in a second throttle command which may be an increased throttle command magnitude, or a throttle command maintained at a magnitude corresponding to engine torque above the torque limit imposed by constrained operation, since the torque constraint limits the response to an initial throttle command. Operation in the upper portion of region 322 permits compensation for the initially constrained torque output affording an opportunity to regain the desired acceleration. At the same time the upper portion of extended region 322 also provides operating points with lower SFC providing greater engine BTE than the operating points available within region 320.

In the illustrative example of FIG. 3, the upper portion and the lower portion of extended region 322 both provide decreased SFC and increased engine BTE relative to region 320. It shall be appreciated, however, that the potential benefits of the controls disclosed herein do not require and are not limited to such conditions. An operation to increase engine cycle efficiency by reducing engine torque below a magnitude corresponding to the throttle command and below a torque curve limit over a first vehicle operation segment and permitting an increase in engine torque above a torque curve limit over a second vehicle operation segment can be found whenever the operating points predicted or commanded in an extended region of operation provide net operation at lower SFC and greater BTE over a horizon than the operating points predicted or commanded in a more constrained region. For example, one portion of the extended region might have the same or similar SFC as the more constrained region while another region provides lower SFC. Similarly, one portion of the extended region might have greater SFC as the more constrained region while another region provides a lower SFC resulting in a net decrease in SFC.

It shall be appreciated that a number of control techniques may be utilized to limit engine operation above torque curve 310. Such techniques may be implemented in a control process such as control process 200. In some forms the time or duration of operation above torque 310 may be limited. Some forms may limit fuel quantity corresponding to operation above torque curve 310, for example, a sum or integral of fuel quantity for a give operating range. Some forms may an amount of work performed corresponding to operation above torque curve 310. Combinations of two or more of the foregoing as well as combinations are also contemplated.

Figure 4:
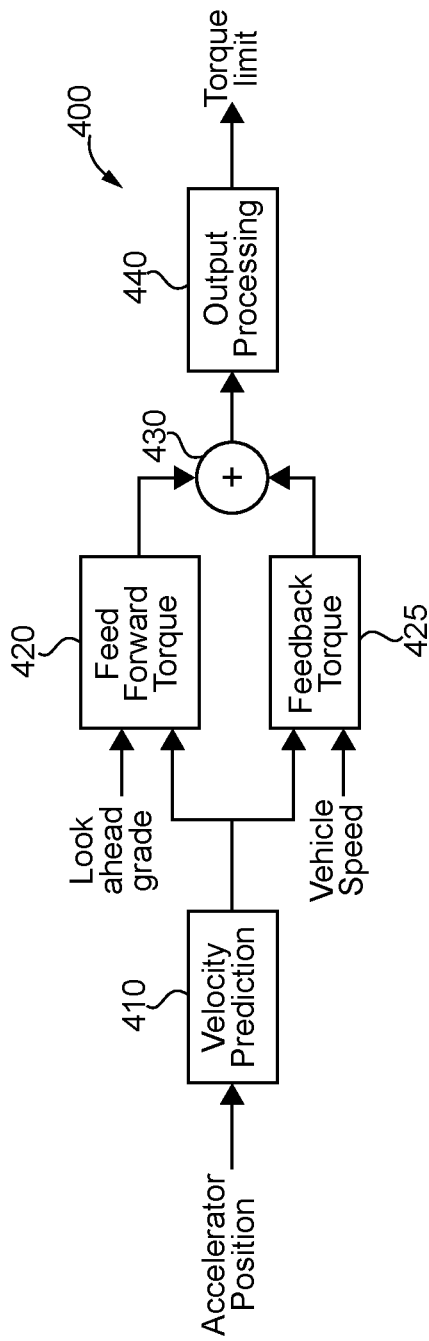
FIGS. 4-11 are block diagrams illustrating various aspects of exemplary controls.

With reference to FIG. 4 there are illustrated exemplary controls 400, which may be implemented and executed by an ECS control component such as DTMS controller 110, engine controller 113 or combinations of these and/or other ECS control components. Controls 400 include a velocity prediction block 410 which receives throttle command information in the form of accelerator pedal position information as an input and determines a predicted vehicle speed which may also be referred to as a vehicle velocity prediction. Velocity prediction block 410 may utilize a number of techniques to determine a predicted vehicle speed including, for example, the techniques described below in connection with FIGS. 6 and 7. The predicted vehicle speed determined by velocity prediction block 410 is provided as input to feedforward torque determination block 420 and feedback torque determination block 425. Feedforward torque determination block 420 also receives look-ahead road grade information which may also be referred to as predicted road grade information as an input and uses its received inputs to determine a feedforward torque value which is provided as input to summation operator 430. Feedback torque determination block 425 also receives current vehicle speed as an input and uses its received inputs to determine a feedback torque value which is provided as an input to summation operator 430 which, in turn, sums its received inputs and provides its output as input to output processing block 440. Output processing block 440 uses its received input to determine a torque limit which it provides as output and may be utilized in connection with limiting engine torque output as described herein. In certain embodiments the output of block 440 may be utilized as a value to limit torque excursions above a torque curve which normally limits engine operation, such as torque curve 310.

In certain implementations of controls 400, as a driver demands power from an engine 112, the engine controller 113 can be configured to predict a velocity in a velocity block 410. The predicted velocity can be used in a feedforward torque determination (along with a look-ahead grade) in a feedforward torque block 420 as well as in a feedback torque determination (along with a vehicle speed) in a feedback torque determination block 430. The resulting output may be summed before undergoing output processing to determine a torque limit. FIG. 4 thus provides one illustration of how a dynamic torque management (DTM) can be implemented on a throttle command.

Figure 5:
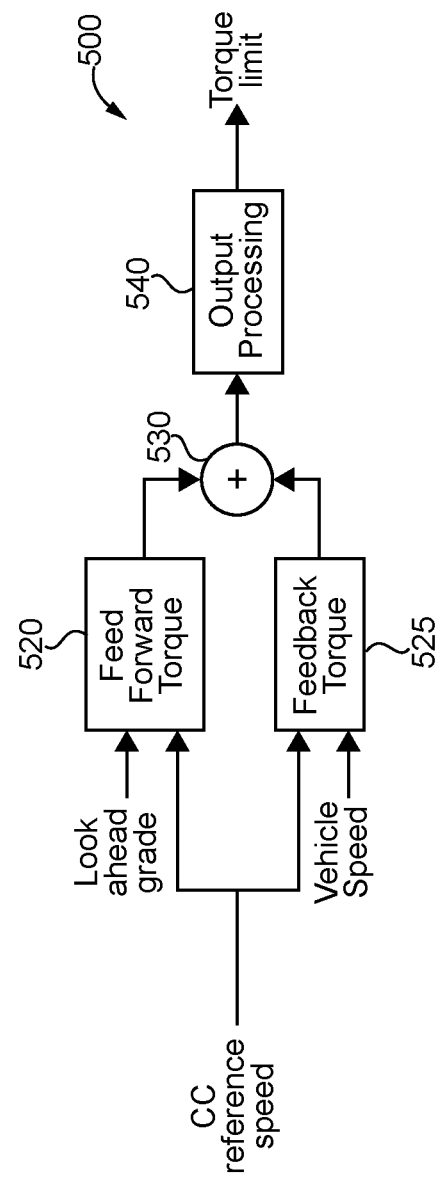

With reference to FIG. 5 there are illustrated exemplary controls 500, which may be implemented and executed by an ECS control component such as DTMS controller 110, engine controller 113 or combinations of these and/or other ECS control components. Controls 500 include a feedforward torque determination block 520 which receives look-ahead road grade information which may also be referred to as predicted road grade information as an input, receives a cruise control reference speed as an input, and uses its received inputs to determine a feedforward torque value which is provided as input to summation operator 530. Feedback torque determination block 525 receives the cruise control reference speed as input, receives a current vehicle speed as an input, and uses its received inputs to determine a feedback torque value which is provided as an input to summation operator 530 which, in turn, sums its received inputs and provides its output as input to output processing block 540. Output processing block 540 uses its received input to determine a torque limit which it provides as output and which may be utilized in connection with limiting engine torque output as described herein. In certain embodiments the output of block 540 may be utilized as a value to limit torque excursions above a torque curve which normally limits engine operation, such as torque curve 310.

Figure 6:
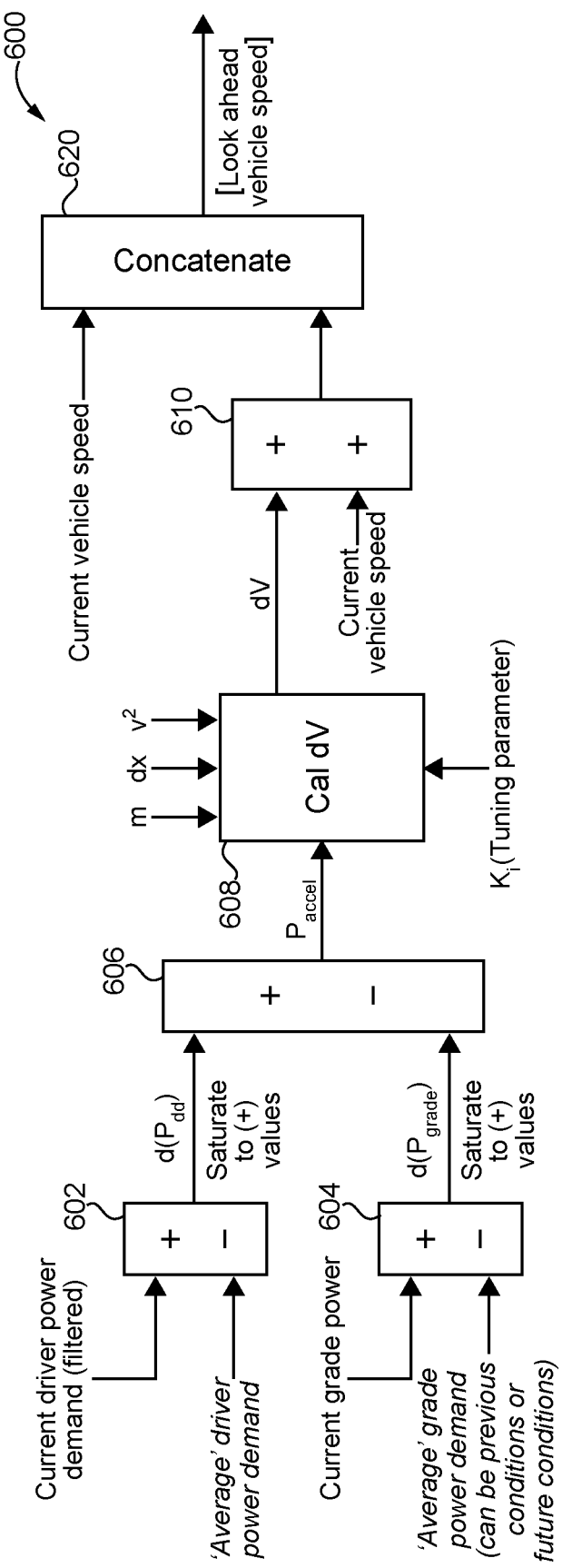

With reference to FIG. 6, there are illustrated exemplary controls 600 which may be implemented and executed by an ECS control component such as DTMS controller 110, engine controller 113 or combinations of these and/or other ECS control components. Controls 600 illustrate one example of controls which may be utilized to dynamically determine vehicle look-ahead speed or predicted vehicle speed using a physics-based model which receives operator or driver power demand such as accelerator pedal position as an input. Controls 600 also provide one example of an alternative implementation of the operations performed by velocity prediction block 410 of controls 400. Controls 600 include block 602 which receives information indicating current operator or driver power demand such as filtered accelerator position information as a first input, receives information indicating the average operator or driver power demand as a second input, determines a difference between the first input and the second input which is utilized as a predicted change in operator or driver power demand ($d(P_{dd})$) which is provided as a first input to block 606.

Controls 600 include block 604 which receives information indicating road grade power demand such as a first input, receives information indicating the average road grade power demand as a second input, determines a difference between the first input and the second input which is utilized as a predicted change in road grade power demand ($d(P_{road\ grade})$) which is provided as a second input to block 606. Block 606 determines a difference between its first and second inputs and which is utilized as a predicted acceleration ($P_{accel}$) input provided to block 608. Block 608 includes a physics-based model which also receives as input a vehicle mass value (m), a change in vehicle position value (dx), and a vehicle velocity value which is velocity squared ($v^2$) in the illustrated embodiment as well as a tuning parameter ($K_i$). Block 608 uses its received inputs and physics-based model to determine a look-ahead vehicle velocity component which may also be referred to as a changing in vehicle velocity (dV) and is provided as input to block 610. Block 610 also receives a current vehicle speed as input and adds its received inputs to determine a look-ahead vehicle speed components which may also be referred to as a predicted vehicle speed. The output of block 610 is provided as input to block 620 along with current vehicle speed and the received inputs are processed through a concatenate function to provide an array or matrix comprising a multiple look-ahead vehicle speed components or predicted vehicle speeds. The output of block 620 can also be provided to vehicle parameter determination controls as well to the control blocks of either FIG. 4 or FIG. 5 which receive a predicted vehicle speed.

Controls 600 provide one example of how a physics-based control approach can be utilized to change a look-ahead or predicted vehicle speed using input indicative of a driver or operator intention. This can be accomplished by making look-ahead speed a function of a driver power demand corresponding to an accelerator pedal position. An average driver power demand can be assessed over a previous time period and compared to a current driver power demand. An average grade power demand can either be based on a historical data or can be a look-ahead if comparison is made to an upcoming grade. In one non-limiting example, when the current driver power demand is in excess of the average driver power demand, a need for greater power might occur when higher engine performance is needed. If current grade power also exceeds the average grade power, the increased driver power demand over the 'average' may indicate an approaching hill, for example, in which case the summation may equal zero. In instances where the current driver power demand is greater than the 'average', and where the current grade power is like the 'average', the summation of the current driver power demand and the current grade power can produce a nonzero acceleration power output. The power acceleration variable (Paccel) that results from the summation of the driver power demand and a grade power will be nonzero if the engine controller 113 determines that an operator wishes to accelerate. The Cal dV operation of utilizes a physics-based model that can determine the change in velocity as a result of the amount of acceleration power. The change in velocity is added to the current vehicle speed, and that amount is concatenated with current vehicle speed before being passed on for further processing.

Figure 7:
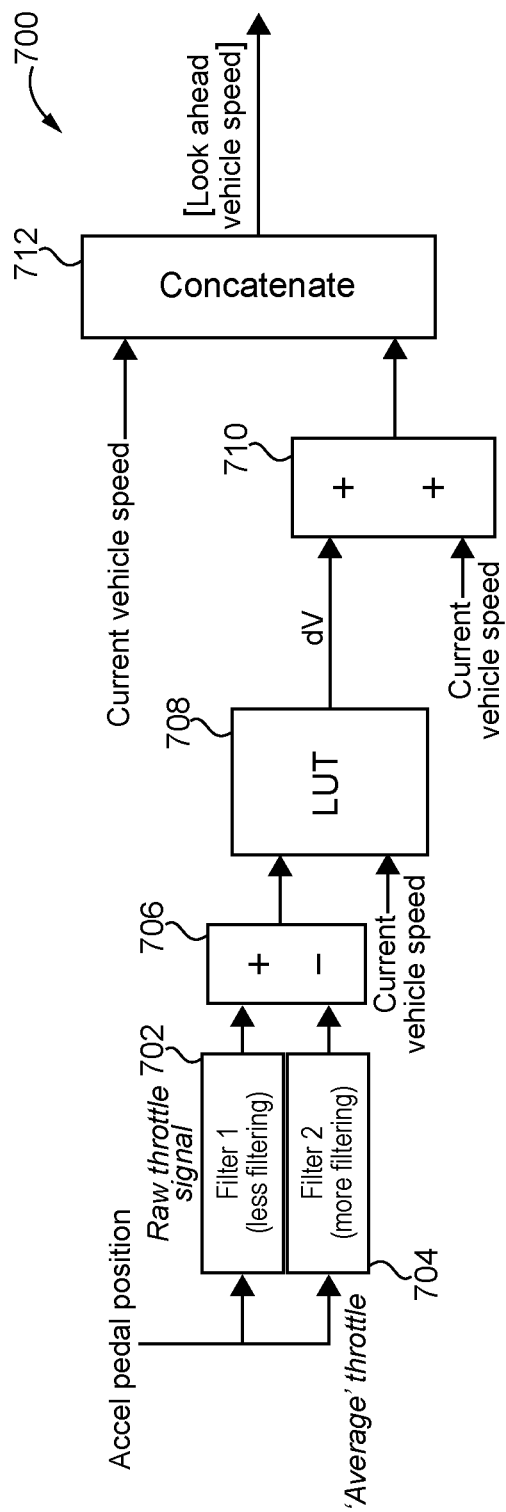

With reference to FIG. 7, there are illustrated exemplary controls 700 which may be implemented and executed by an ECS control component such as DTMS controller 110, engine controller 113 or combinations of these and/or other ECS control components. Controls 700 illustrate one example of controls which may be utilized to dynamically determine vehicle look-ahead speed or predicted vehicle speed using empirical information. Controls 700 also provide one example of the operations which may be performed by velocity prediction block 410 of controls 400. Controls 700 include blocks 702 and 204 which receive receives operator or driver power demand such as accelerator pedal position as an input, filter the received inputs using varying degrees and/or types of filtering and provide filtered output information to block 706. Block 706 determines a difference between its received inputs and outputs the difference to block 708 which also receives current vehicle speed as an input. Block 708 includes an empirically-determined look up table (LUT) which is one example of an operator which can be used to determine a predicted change in vehicle velocity (dV) based on the received inputs. In the illustrated form, the LUT of block 708 defines or includes an empirically derived relationship between accelerator pedal position, current vehicle speed and predicted changes in vehicle speed. Other implementations include those utilizing explicit calculations, estimations or other computational techniques.

Block 708 provides the predicted change in vehicle velocity (dV) as input to block 710 which also receives current vehicle speed as an input and adds its received inputs to determine a look-ahead vehicle speed components which may also be referred to as a predicted vehicle speed. The output of block 710 is provided as input to block 712 along with current vehicle speed and the received inputs are processed through a concatenate function to provide an array or matrix comprising a multiple look-ahead vehicle speed components or predicted vehicle speeds. The output of block 712 can also be provided to vehicle parameter determination controls as well to the control blocks of either FIG. 4 or FIG. 5 which receive a predicted vehicle speed.

The controls of FIG. 7 provide one example of an empirical-based approach to determining velocity changes. In certain forms of controls 700 an accelerator pedal position is compared against an average throttle position to produce a difference between the two. A look-up-table (LUT) can be used which compares the difference between current and 'average' throttle position against the current vehicle speed, and through a look-up-table scheme which may be based on offline data analysis determines a delta velocity (dV) which is added to current vehicle speed. The summation of the dV with current vehicle speed is concatenated with current vehicle speed and passes the result of that concatenation to other controls.

Figure 8:
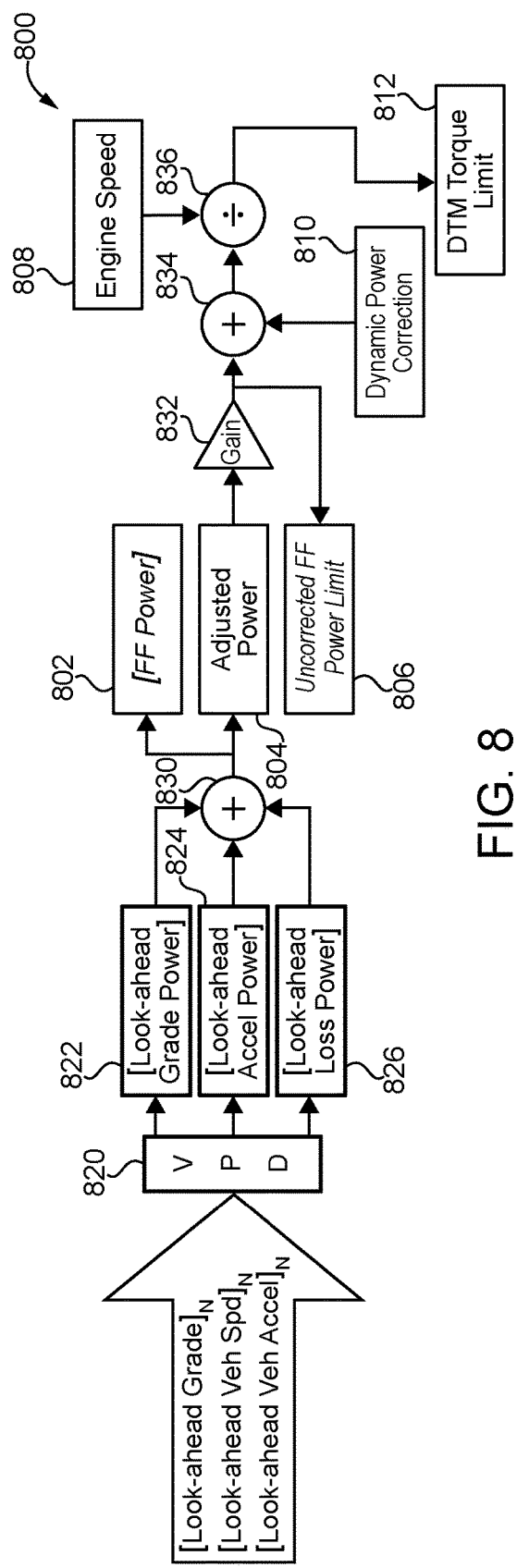

With reference to FIG. 8, there are illustrated exemplary controls 800 which may be implemented and executed by an ECS control component such as DTMS controller 110, engine controller 113 or combinations of these and/or other ECS control components. Controls 800 provide one example of controls adapted to execute dynamic torque management. Controls 800 include vehicle parameter determination (VPD) block 820 which receives a look-ahead vehicle parameter vector including a look-ahead grade components a look-ahead vehicle speed component and a look-ahead vehicle acceleration component which may be or may be based upon corresponding or equivalent parameters described above, for example, in connection with FIGS. 6 and 7. Block 820 uses a model of vehicle operation to determine a look-ahead grade power value 822, a look-ahead acceleration power value 824, and a look-ahead loss power value 826 which are provided to and summed by operator 830 which, in turn, provides the summed output as a feed forward power value 802 and an adjusted power value 804. Gain operator 832 receives and amplifies adjusted power value 804 and provide the amplified output as uncorrected feedforward power limit value 806 which is also provided as an input to operator 834. A dynamic power correction value 810 is also provided to operator 834 which provides a corrected feedforward power limit to operator 836. Dynamic power correction value 810 provides correction for uncertainty in look-ahead parameters through a feedback mechanism. An engine speed value 808 is also provided to operator 836 which performs a division operation to generate a dynamic torque management torque (DTM) limit value 812 which may be utilized in limiting engine torque as described herein above.

Figure 9:
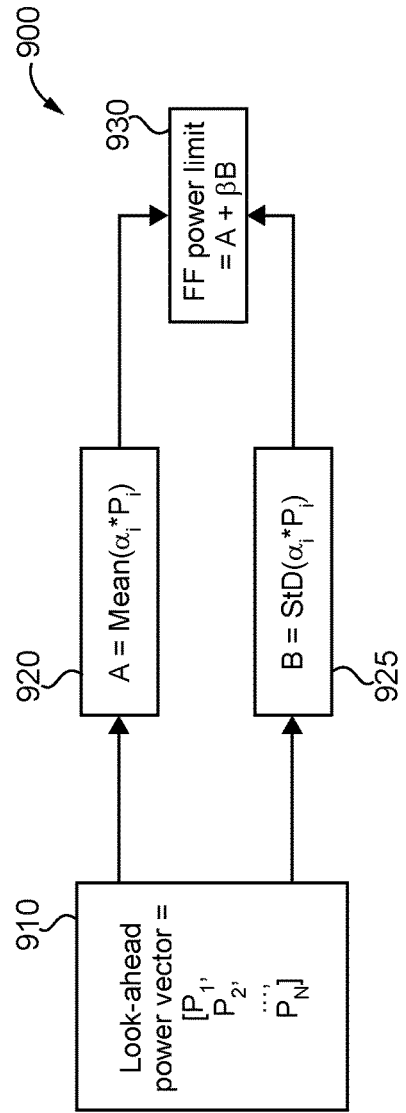

With reference to FIG. 9, there are illustrated exemplary controls 900 which may be implemented and executed by an ECS control component such as DTMS controller 110, engine controller 113 or combinations of these and/or other ECS control components. Controls 900 provide one example of an implementation of block 802 of controls 800. In controls 900, look-ahead power vector 910 (which may correspond to the input to values 822, 824 and 826 is provided as input to blocks 920 and 925 which determine a mean value and a standard deviation values using the received inputs. The mean value and standard deviation value of block 920 and 925, respectively, are provided to block 930 which determines a feed forward power limit. In certain forms the feed forward power limit is determined in accordance with the equation FF power limit=A+βB where β can be tuned to maximize fuel economy without undesired effects on drivability.

Figure 10:
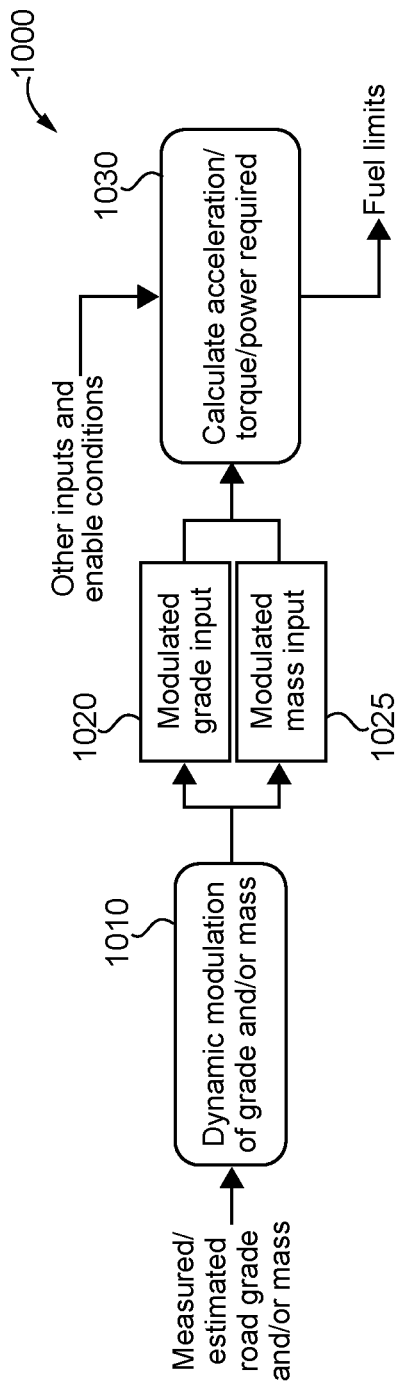

With reference to FIG. 10, there are illustrated exemplary controls 1000 which may be implemented and executed by an ECS control component such as DTMS controller 110, engine controller 113 or combinations of these and/or other ECS control components. Controls 1000 provide one example of a torque management implementation in which a measured or estimated road grade and/or mass may be modified to deviate from the actual measured or estimated values to artificially manage a torque limit. In the illustrated form measured or estimated road grade values and/or vehicle mass values are provided to block 1010 which performs dynamic modulation of the received inputs to alter their true values to provide modulated grade input value 1020 and/or modulated mass input 1025 which may also be referred to as artificial values for road grade and/or vehicle mass. Values 1020 and 1025 are provided alone with other inputs and enable conditions to block 1030 which calculates one or more of an acceleration, a torque and a power which may be required and outputs a torque limits in the form of a fuel limit which may be utilized to limit engine torque as described herein above. It can therefore be seen that controls 1000 provide a unique control lever or variable that can be used to determine and impose limits on engine torque.

In certain implementations controls 1000 implement a tradeoff between performance and fuel economy by limiting fueling to enable vehicle behavior as if it is subjected to different load by a combination of changes to vehicle mass input or road grade input to a fuel limiting algorithm. Such an approach might increase fuel economy by decreasing vehicle performance. In one non-limiting example, vehicle mass can be changed to values not representative of actual weight to influence the fuel limiting algorithm. Such changes to mass (and/or road grade in other embodiments) can be used in a fashion in which those values are modulated and used as inputs to calculate acceleration/torque/power required. The results of this step can be used to determine a fuel limit. By changing vehicle mass input, the controls can limit fueling through calculating fuel required for a specified maneuver by a vehicle mass higher than actual vehicle mass. Fuel limiting can be performed by dynamically modulating vehicle mass input and calculating an acceleration limit. As an example, acceleration required for higher mass vehicle compared to actual mass of vehicle is calculated, leading to increase in fuel economy. By changing road grade input, the controls can limit fueling through calculating power required for a specific maneuver on a road grade different than actual road grade. As an example, power based on assuming higher road grade compared to actual road grade is calculated, leading to increase in fuel economy. It can therefore be seen that controls 1100 provide a unique control lever or variable that can be used to determine when to impose or not to impose limits on engine torque.

Figure 11:
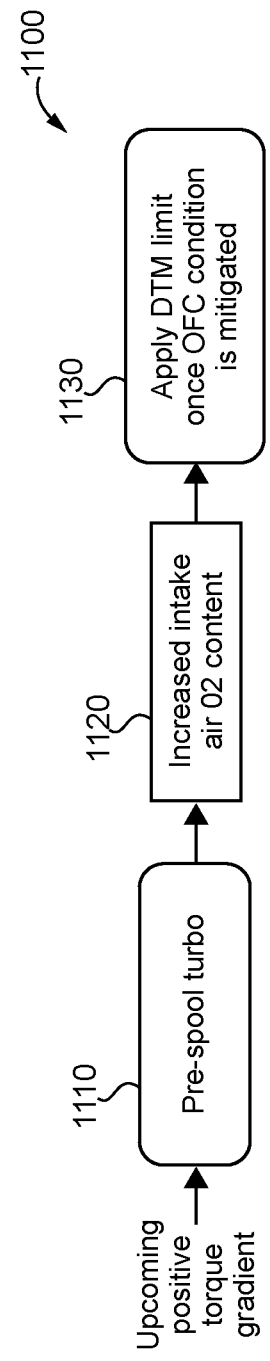

With reference to FIG. 11, there are illustrated exemplary controls 1100 which may be implemented and executed by an ECS control component such as DTMS controller 110, engine controller 113 or combinations of these and/or other ECS control components. Controls 1100 provide one example of a control technique which can be used to improve transient performance by mitigating the impact of oxygen-to-fuel (OFC) control limits. Controls 1100 include block 1110 which receives information indicating a predicted or upcoming positive torque gradient, for example, a predicted acceleration event and in response commands a turbocharger to accelerate in anticipation of the predicted positive torque gradient also referred to as pre-spooling. The pre-spooling operation at block 1110 results in increased intake air 02 content which may be indicated by value 1120 and may be provided as an input to block 1130. Block 1130 utilizes the received input to apply a dynamic torque management (DTM) limit the OFC limit condition is mitigated.

Controls 1100 provide one example of how transient performance can be improved by mitigating oxygen fuel constraint (OFC) limits. Such an approach can increase performance by decreasing fuel economy. Embodiments implemented in this approach could improve transient performance by mitigating OFC limits. Through pre-emptively increasing intake air 02 content for an upcoming positive torque gradient giving the system a better immediate transient performance that may be traded-off for fuel economy. For example, pre-spooling the turbo in response to an upcoming positive grade change to mitigate OFC limits and applying DTM limit later on. This approach may require changes in combustion recipe such as air/fuel mixture.

A number of exemplary embodiments shall now be further described. It shall be appreciated that the features of each embodiment disclosed herein may apply to and may be incorporated into the other embodiments disclosed herein and that the further features of various forms of each embodiment disclose herein may likewise apply to and may be incorporated into the other embodiments disclosed herein as will be appreciated by a person of skill in the art with the benefit of the present disclosure.

One exemplary embodiment is a method of operating an integrated circuit-based electronic control system (ECS) to control an engine to propel a vehicle. The method comprises receiving a throttle command with the ECS; determining with the ECS an operation to increase engine cycle efficiency by reducing engine torque below a magnitude corresponding to the throttle command and below a torque curve limit over a first vehicle operation segment and permitting an increase in engine torque above the torque curve limit over a second vehicle operation segment; controlling the engine to output torque below the magnitude corresponding to the throttle command and below the torque curve limit over the first vehicle operation segment; and controlling the engine to output torque above the torque curve limit over the second vehicle operation segment in response to a second throttle command received by the ECS and constrained by an extended limit on operation of the engine above the torque curve limit.

In certain forms of the exemplary method the first vehicle operation segment and the second vehicle operation segment are defined in units of time. In certain forms of the method the act determining with the ECS an operation to increase engine cycle efficiency utilizes look-ahead information including at least one of a predicted road grade and a predicted vehicle speed. In certain forms of the exemplary method the act of reducing engine torque below the magnitude corresponding to the throttle command and below the torque curve limit over the first vehicle operation segment comprises: determining a feedforward torque using the predicted road grade and a cruise control reference speed, determining a feedback torque using the cruise control reference speed and a vehicle speed, determining a torque limit using the feedforward torque and the feedback torque, and using the torque limit to limit engine torque below the magnitude corresponding to the throttle command and below the torque curve limit. In certain forms of the exemplary method the act of reducing engine torque below the magnitude corresponding to the throttle command and below the torque curve limit over the first vehicle operation segment comprises: determining a feedforward torque using the predicted road grade and the predicted vehicle speed, determining a feedback torque using the predicted vehicle speed and a current vehicle speed, determining a torque limit using the feedforward torque and the feedback torque, and using the torque limit to limit engine torque below a magnitude corresponding to the throttle command and below a torque curve limit. In certain forms of the exemplary method the predicted vehicle speed is determined by: determining a predicted acceleration power demand using a predicted change in operator power demand and a predicted change in road grade power demand, determining a predicted change in vehicle velocity with a physics-based model using the predicted acceleration power demand and information of a vehicle mass and a vehicle velocity, and determining the predicted vehicle speed using the predicted change in velocity and the current vehicle speed. In certain forms of the exemplary method at least one of a road grade value and vehicle mass value is dynamically modified from an actual measurement or estimate value to vary a fueling limit utilized in the act of reducing engine torque. In certain forms of the exemplary method the predicted vehicle speed is determined using an empirically derived relationship between accelerator pedal position, current vehicle speed and predicted vehicle speed. In certain forms of the exemplary method a turbocharger is controlled to in response to a predicted increase in road grade to increase an oxygen-to-fuel ratio in advance of the predicted increase in road grade. In certain forms of the exemplary method the operation of the ECS is effective to provide increased engine brake thermal efficiency relative to engine brake thermal efficiency resulting from following the throttle command without reducing engine torque and constraining engine operation with the torque curve limit without permitting engine torque above the torque curve limit.

A further exemplary embodiment is a system comprising an engine; and an integrated circuit-based electronic control system (ECS) structured to control the engine, the ECS being structured to: receive a throttle command; determine an operation to increase engine cycle efficiency by reducing engine torque below a magnitude corresponding to the throttle command and below a torque curve limit over a first vehicle operation segment and permitting an increase in engine torque above the torque curve limit over a second vehicle operation segment; control the engine to output torque below the magnitude corresponding to the throttle command and below the torque curve limit over the first vehicle operation segment; and control the engine to output torque above the torque curve limit over the second vehicle operation segment in response to a second throttle command received by the ECS and constrained by an extended limit on operation of the engine above the torque curve limit.

In certain forms of the exemplary system the first vehicle operation segment and the second vehicle operation segment are defined in units of distance. In certain forms of the exemplary method the ECS is structure to utilize look-ahead information including at least one of a predicted road grade and a predicted vehicle speed to determine the operation to increase engine cycle efficiency. In certain forms of the exemplary method the ECS is structure to reduce engine torque below the magnitude corresponding to the throttle command and below the torque curve limit over the first vehicle operation segment by: determining a feedforward torque using the predicted road grade and a cruise control reference speed, determining a feedback torque using the cruise control reference speed and a vehicle speed, determining a torque limit using the feedforward torque and the feedback torque, and using the torque limit to limit engine torque below the magnitude corresponding to the throttle command and below the torque curve limit. In certain forms of the exemplary method the ECS is structured to reduce engine torque below the magnitude corresponding to the throttle command and below the torque curve limit over the first vehicle operation segment by: determining a feedforward torque using the predicted road grade and the predicted vehicle speed, determining a feedback torque using the predicted vehicle speed and a current vehicle speed, determining a torque limit using the feedforward torque and the feedback torque, and using the torque limit to limit engine torque below a magnitude corresponding to the throttle command and below a torque curve limit. In certain forms of the exemplary method the ECS is structured to determine the predicted vehicle speed by: determining a predicted acceleration power demand using a predicted change in operator power demand and a predicted change in road grade power demand, determining a predicted change in vehicle velocity with a physics-based model using the predicted acceleration power demand and information of a vehicle mass and a vehicle velocity, and determining the predicted vehicle speed using the predicted change in velocity and the current vehicle speed. In certain forms of the exemplary method the ECS is structured to dynamically modify at least one of a road grade value and vehicle mass value from an actual measurement or estimate value to vary a fueling limit utilized in the act of reducing engine torque. In certain forms of the exemplary method the ECS is structured to determine the predicted vehicle speed using an empirically derived relationship between accelerator pedal position, current vehicle speed and predicted vehicle speed. In certain forms of the exemplary method wherein the ECS is structured to control a turbocharger in response to a predicted increase in road grade to increase an oxygen-to-fuel ratio in advance of the predicted increase in road grade. In certain forms of the exemplary method operation of the ECS is effective to provide increased engine brake thermal efficiency relative to engine brake thermal efficiency resulting from following the throttle command without reducing engine torque and constraining engine operation with the torque curve limit without permitting engine torque above the torque curve limit.

Another exemplary embodiment is an apparatus comprising: an integrated circuit-based electronic control system (ECS) structured to control an engine, the ECS being configured with executable instructions stored on one or more non-transitory memory media and executable by the ECS to: receive a throttle command; determine an operation to increase engine cycle efficiency by reducing engine torque below a magnitude corresponding to the throttle command and below a torque curve limit over a first vehicle operation segment and permitting an increase in engine torque above the torque curve limit over a second vehicle operation segment; control the engine to output torque below the magnitude corresponding to the throttle command and below the torque curve limit over the first vehicle operation segment; and control the engine to output torque above the torque curve limit over the second vehicle operation segment in response to a second throttle command received by the ECS and constrained by an extended limit on operation of the engine above the torque curve limit.

In certain forms of the exemplary apparatus the first vehicle operation segment and the second vehicle operation segment are defined in units of distance. In certain forms of the exemplary apparatus wherein the ECS is structure to utilize look-ahead information including at least one of a predicted road grade and a predicted vehicle speed to determine the operation to increase engine cycle efficiency. In certain forms of the exemplary apparatus the ECS is structure to reduce engine torque below the magnitude corresponding to the throttle command and below the torque curve limit over the first vehicle operation segment by: determining a feedforward torque using the predicted road grade and a cruise control reference speed, determining a feedback torque using the cruise control reference speed and a vehicle speed, determining a torque limit using the feedforward torque and the feedback torque, and using the torque limit to limit engine torque below the magnitude corresponding to the throttle command and below the torque curve limit. In certain forms of the exemplary apparatus the ECS is structured to reduce engine torque below the magnitude corresponding to the throttle command and below the torque curve limit over the first vehicle operation segment by: determining a feedforward torque using the predicted road grade and the predicted vehicle speed, determining a feedback torque using the predicted vehicle speed and a current vehicle speed, determining a torque limit using the feedforward torque and the feedback torque, and using the torque limit to limit engine torque below a magnitude corresponding to the throttle command and below a torque curve limit. In certain forms of the exemplary apparatus the ECS is structured to determine the predicted vehicle speed by: determining a predicted acceleration power demand using a predicted change in operator power demand and a predicted change in road grade power demand, determining a predicted change in vehicle velocity with a physics-based model using the predicted acceleration power demand and information of a vehicle mass and a vehicle velocity, and determining the predicted vehicle speed using the predicted change in velocity and the current vehicle speed. In certain forms of the exemplary apparatus the ECS is structured to dynamically modify at least one of a road grade value and vehicle mass value from an actual measurement or estimate value to vary a fueling limit utilized in the act of reducing engine torque. In certain forms of the exemplary apparatus the ECS is structured to determine the predicted vehicle speed using an empirically derived relationship between accelerator pedal position, current vehicle speed and predicted vehicle speed. In certain forms of the exemplary apparatus the ECS is structured to control a turbocharger in response to a predicted increase in road grade to increase an oxygen-to-fuel ratio in advance of the predicted increase in road grade. In certain forms of the exemplary apparatus operation of the ECS is effective to provide increased engine brake thermal efficiency relative to engine brake thermal efficiency resulting from following the throttle command without reducing engine torque and constraining engine operation with the torque curve limit without permitting engine torque above the torque curve limit.

A further exemplary embodiment is an apparatus to modify fuel economy of a vehicle comprising: an engine controller of the vehicle configured to operate an internal combustion engine by making adjustments to a torque of the vehicle based on one or more parameters, wherein the one or more parameters include a power request or forecast information. In certain forms of the apparatus the forecast information includes road grade forecast information. In certain forms of the apparatus the adjustments to a torque include an adjustment to a torque curve, and the engine controller permits a variation from a load acceptance curve by a torque curve release. In certain forms of the apparatus the torque curve release is formed by a temporary shifting between a baseline load acceptance curve and an upper torque curve. Certain forms of the apparatus comprise a torque control system is communicatively coupled to the engine controller, wherein the engine controller is configured to compute a velocity prediction for a determination of a torque limit implementable to make adjustments to the torque. In certain forms of the apparatus the torque control system is implementable on a throttle, on a pre-set speed, or both. In certain forms of the apparatus the velocity prediction is computed from a physics-based model or an empirically-based model and are implementable in conjunction with forecast road grade information and road speed limit information that is provided to the engine controller. In certain forms of the apparatus the engine controller is configured to artificially modify at least one of a vehicle weight or a road grade to effect a fuel limit to make the adjustments to the torque. In certain forms of the apparatus the engine controller is configured to increase intake oxygen content to anticipate a positive torque gradient to make the adjustments to the torque.

Another exemplary embodiment is a method to modify fuel economy of a vehicle comprising: providing adjustments, at an engine controller of the vehicle, to a torque curve based on one or more parameters, wherein the one or more parameters include a power request or forecast information.

A further exemplary embodiment is a method to manage a torque of a vehicle comprising: determining, with an electronic control system, an effect of at least one of a load acceptance curve and an engine cycle efficiency relative to an applied torque limit, wherein the determining occurs over one of a time interval and a distance interval; determining, by the engine with the electronic control system, whether decreasing the applied torque limit in a first time period and increasing the applied torque limit in a second time period results in an increased engine cycle efficiency, wherein the second time period is subsequent to the first time period; and after making the determinations, applying, by the engine controller, a torque limit reduction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention claimed is:

1. A method of operating an integrated circuit-based electronic control system (ECS) to control an engine to propel a vehicle, the method comprising:
   receiving a throttle command with the ECS;
   determining with the ECS an operation to increase engine cycle efficiency by reducing engine torque below a magnitude corresponding to the throttle command and below a torque curve limit over a first vehicle operation segment and permitting an increase in the engine torque above the torque curve limit over a second vehicle operation segment;
   controlling the engine to output torque below the magnitude corresponding to the throttle command and below the torque curve limit over the first vehicle operation segment, said controlling being performed for the throttle command being in response to a driver input and for the throttle command being in response to a signal from a cruise control system implemented in the ECS; and
   controlling the engine to output torque above the torque curve limit over the second vehicle operation segment in response to a second throttle command received by the ECS and constrained by an extended limit on operation of the engine above the torque curve limit.

2. The method according to claim 1 wherein the first vehicle operation segment and the second vehicle operation segment are defined in units of time.

3. The method according to claim 1 wherein the determining with the ECS the operation to increase engine cycle efficiency utilizes look-ahead information including at least one of a predicted road grade and a predicted vehicle speed.

4. The method according to claim 3 wherein the reducing the engine torque below the magnitude corresponding to the throttle command and below the torque curve limit over the first vehicle operation segment comprises:
   determining a feedforward torque using the predicted road grade and a cruise control reference speed,
   determining a feedback torque using the cruise control reference speed and a current vehicle speed,
   determining a torque limit using the feedforward torque and the feedback torque, and
   using the torque limit to limit the engine torque below the magnitude corresponding to the throttle command and below the torque curve limit.

5. The method according to claim 3 wherein the reducing the engine torque below the magnitude corresponding to the throttle command and below the torque curve limit over the first vehicle operation segment comprises:
   determining a feedforward torque using the predicted road grade and the predicted vehicle speed,
   determining a feedback torque using the predicted vehicle speed and a current vehicle speed,
   determining a torque limit using the feedforward torque and the feedback torque, and
   using the torque limit to limit the engine torque below the magnitude corresponding to the throttle command and below the torque curve limit.

6. The method according to claim 3 wherein the predicted vehicle speed is determined by:
   determining a predicted acceleration power demand using a predicted change in operator power demand and a predicted change in road grade power demand,
   determining a predicted change in vehicle velocity with a physics-based model using the predicted acceleration power demand and information of a vehicle mass and a vehicle velocity, and
   determining the predicted vehicle speed using the predicted change in vehicle velocity and a current vehicle speed.

7. The method according to claim 6 wherein at least one of a road grade value and vehicle mass value is dynamically modified from an actual measurement or estimate value to vary a fueling limit utilized in the reducing the engine torque.

8. The method according to claim 3 wherein the predicted vehicle speed is determined using an empirically derived relationship between values of accelerator pedal position, current vehicle speed and predicted vehicle speed.

9. The method according to claim 1 wherein a turbocharger is controlled in response to a predicted increase in road grade to increase an oxygen-to-fuel ratio in advance of the predicted increase in road grade.

10. The method according to claim 1 wherein the operation of the ECS is effective to provide increased engine brake thermal efficiency relative to engine brake thermal efficiency resulting from following the throttle command without reducing the engine torque and constraining engine operation with the torque curve limit without permitting the engine torque above the torque curve limit.

11. A system comprising:
   an engine; and
   an integrated circuit-based electronic control system (ECS) structured to control the engine, the ECS being structured to:
   receive a throttle command;
   determine an operation to increase engine cycle efficiency by reducing engine torque below a magnitude corresponding to the throttle command and below a torque curve limit over a first vehicle operation segment and permitting an increase in the engine torque above the torque curve limit over a second vehicle operation segment;
   control the engine to output torque below the magnitude corresponding to the throttle command and below the torque curve limit over the first vehicle operation segment; and
   control the engine to output torque above the torque curve limit over the second vehicle operation segment in response to a second throttle command received by the ECS and constrained by an extended limit on operation of the engine above the torque curve limit;
   wherein the ECS is structured to control the engine to output torque below the magnitude corresponding to the throttle command and below the torque curve limit over the first vehicle operation segment at least in response to the throttle command resulting from an output of a cruise control system.

12. The system according to claim 11 wherein the first vehicle operation segment and the second vehicle operation segment are defined in units of distance.

13. The system according to claim 11 wherein the ECS is structured to utilize look-ahead information including at least one of a predicted road grade and a predicted vehicle speed to determine the operation to increase engine cycle efficiency.

14. The system according to claim 13 wherein the ECS is structured to reduce the engine torque below the magnitude corresponding to the throttle command and below the torque curve limit over the first vehicle operation segment by:
    determining a feedforward torque using the predicted road grade and a cruise control reference speed,
    determining a feedback torque using the cruise control reference speed and a current vehicle speed,
    determining a torque limit using the feedforward torque and the feedback torque, and
    using the torque limit to limit the engine torque below the magnitude corresponding to the throttle command and below the torque curve limit.

15. The system according to claim 13 wherein the ECS is structured to reduce the engine torque below the magnitude corresponding to the throttle command and below the torque curve limit over the first vehicle operation segment by:
    determining a feedforward torque using the predicted road grade and the predicted vehicle speed,
    determining a feedback torque using the predicted vehicle speed and a current vehicle speed,
    determining a torque limit using the feedforward torque and the feedback torque, and
    using the torque limit to limit the engine torque below the magnitude corresponding to the throttle command and below the torque curve limit.

16. The system according to claim 13 wherein the ECS is structured to determine the predicted vehicle speed by:
    determining a predicted acceleration power demand using a predicted change in operator power demand and a predicted change in road grade power demand,
    determining a predicted change in vehicle velocity with a physics-based model using the predicted acceleration power demand and information of a vehicle mass and a vehicle velocity, and
    determining the predicted vehicle speed using the predicted change in vehicle velocity and a current vehicle speed.

17. The system according to claim 16 wherein the ECS is further structured to dynamically modify at least one of a road grade value and vehicle mass value from an actual measurement or estimate value to vary a fueling limit utilized in the reducing the engine torque.

18. The system according to claim 13 wherein the ECS is structured to determine the predicted vehicle speed using an empirically derived relationship between values of accelerator pedal position, current vehicle speed and predicted vehicle speed.

19. The system according claim 11 wherein the ECS is further structured to control a turbocharger in response to a predicted increase in road grade to increase an oxygen-to-fuel ratio in advance of the predicted increase in road grade.

20. The system according to claim 11 wherein the ECS is configured to provide increased engine brake thermal efficiency relative to engine brake thermal efficiency resulting from following the throttle command without reducing the engine torque and constraining engine operation with the torque curve limit without permitting the engine torque above the torque curve limit.

21. An apparatus comprising:
    an integrated circuit-based electronic control system (ECS) structured to control an engine, the ECS being configured with executable instructions stored on one or more non-transitory memory media and executable by the ECS to:
    receive a throttle command;
    determine an operation to increase engine cycle efficiency by reducing engine torque below a magnitude corresponding to the throttle command and below a torque curve limit over a first vehicle operation segment and permitting an increase in the engine torque above the torque curve limit over a second vehicle operation segment;
    control the engine to output torque below the magnitude corresponding to the throttle command and below the torque curve limit over the first vehicle operation segment; and
    control the engine to output torque above the torque curve limit over the second vehicle operation segment in response to a second throttle command received by the ECS and constrained by an extended limit on operation of the engine above the torque curve limit;
    wherein the throttle command comprises a cruise control throttle command.

22. The apparatus according to claim 21 wherein the first vehicle operation segment and the second vehicle operation segment are defined in units of distance.

23. The apparatus according to claim 21 wherein the ECS is structured to utilize look-ahead information including at least one of a predicted road grade and a predicted vehicle speed to determine the operation to increase engine cycle efficiency.

24. The apparatus according to claim 23 wherein the ECS is structured to reduce the engine torque below the magnitude corresponding to the throttle command and below the torque curve limit over the first vehicle operation segment by:
    determining a feedforward torque using the predicted road grade and a cruise control reference speed,
    determining a feedback torque using the cruise control reference speed and an actual vehicle speed,
    determining a torque limit using the feedforward torque and the feedback torque, and
    using the torque limit to limit the engine torque below the magnitude corresponding to the throttle command and below the torque curve limit.

25. The apparatus according to claim 23 wherein the ECS is structured to reduce the engine torque below the magnitude corresponding to the throttle command and below the torque curve limit over the first vehicle operation segment by:
    determining a feedforward torque using the predicted road grade and the predicted vehicle speed,
    determining a feedback torque using the predicted vehicle speed and a current vehicle speed,
    determining a torque limit using the feedforward torque and the feedback torque, and
    using the torque limit to limit the engine torque below the magnitude corresponding to the throttle command and below the torque curve limit.

26. The apparatus according to claim 23 wherein the ECS is structured to determine the predicted vehicle speed by:
    determining a predicted acceleration power demand using a predicted change in operator power demand and a predicted change in road grade power demand, determining a predicted change in vehicle velocity with a physics-based model using the predicted acceleration power demand and information of a vehicle mass and a vehicle velocity, and determining the predicted vehicle speed using the predicted change in vehicle velocity and a current vehicle speed.

27. The apparatus according to claim 26 wherein the ECS is further structured to dynamically modify at least one of a road grade value and vehicle mass value from an actual measurement or estimate value to vary a fueling limit utilized in the reducing the engine torque.

28. The apparatus according to claim 23 wherein the ECS is structured to determine the predicted vehicle speed using an empirically derived relationship between values of accelerator pedal position, current vehicle speed and predicted vehicle speed.

29. The apparatus according to claim 21 wherein the ECS is further structured to control a turbocharger in response to a predicted increase in road grade to increase an oxygen-to-fuel ratio in advance of the predicted increase in road grade.

30. The apparatus according to claim 21 wherein the ECS is configured to provide increased engine brake thermal efficiency relative to engine brake thermal efficiency resulting from following the throttle command without reducing the engine torque and constraining engine operation with the torque curve limit without permitting the engine torque above the torque curve limit.

* * * * *